Dec. 3, 1957  L. S. HAMER  2,815,187
SEALED GATE VALVE
Filed Aug. 2, 1954  3 Sheets-Sheet 1
Fig. 2.
Fig. 1.
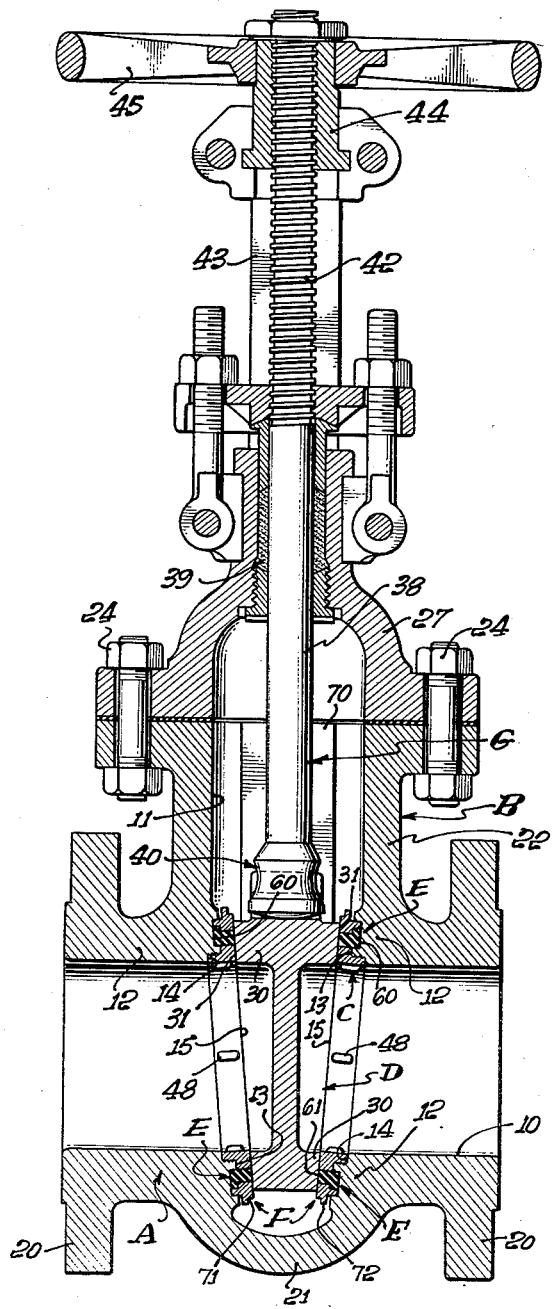
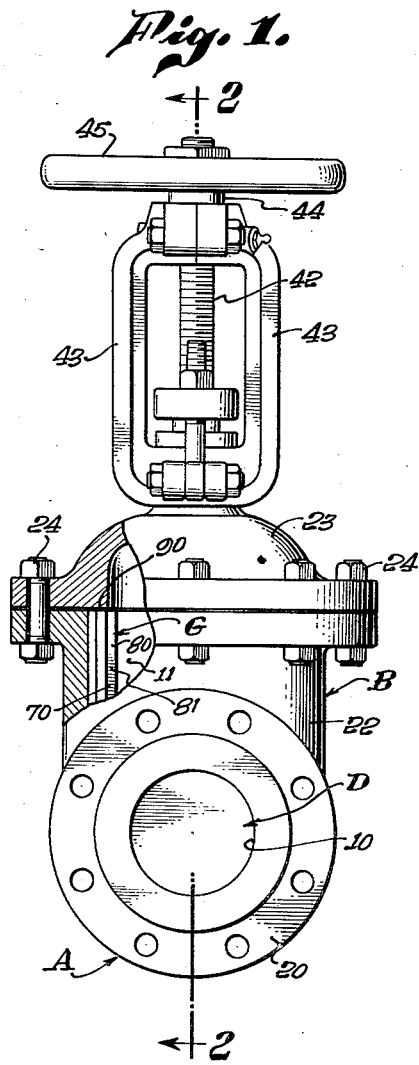
INVENTOR.
LELAND S. HAMER,
BY
ATTORNEY.

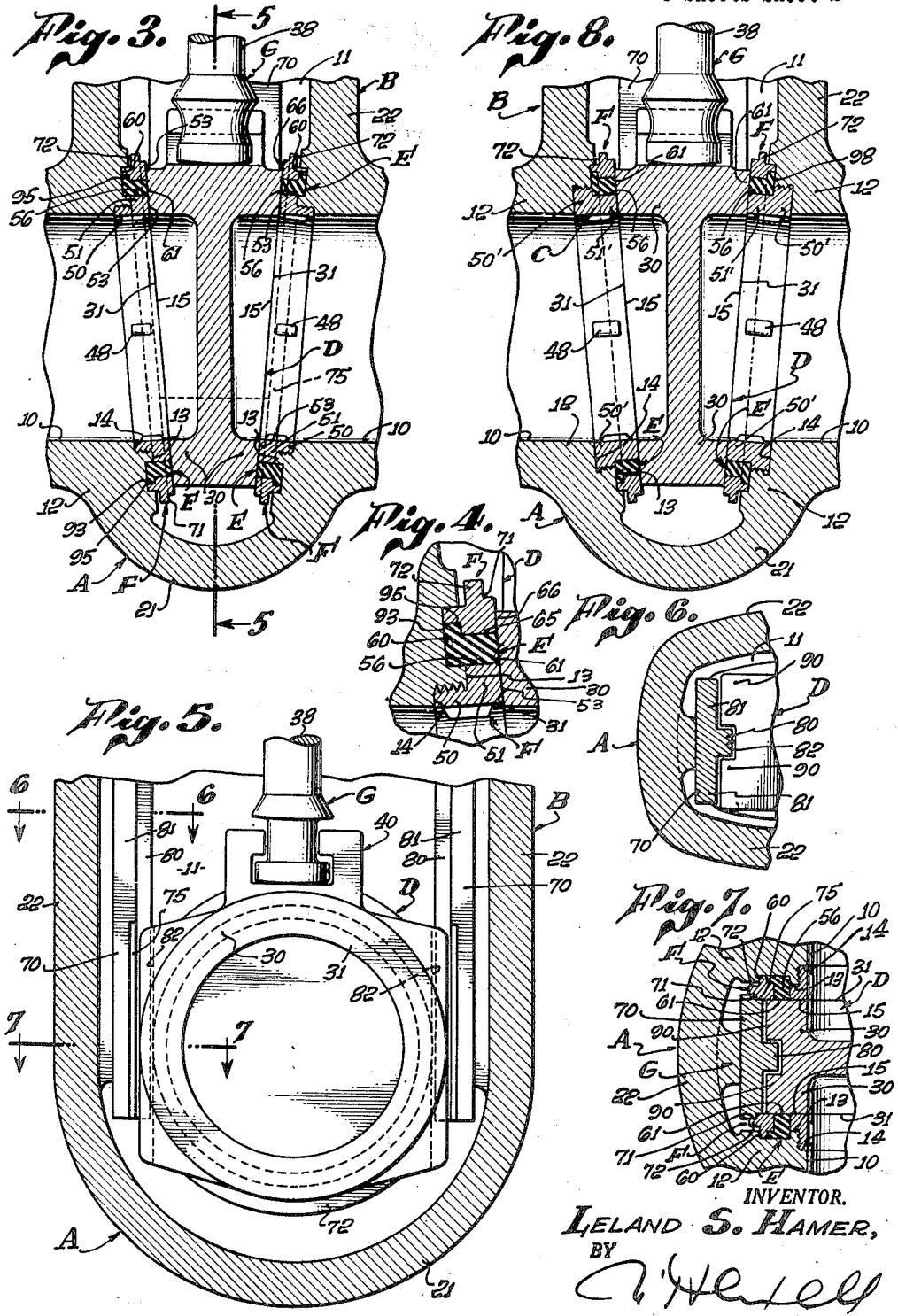

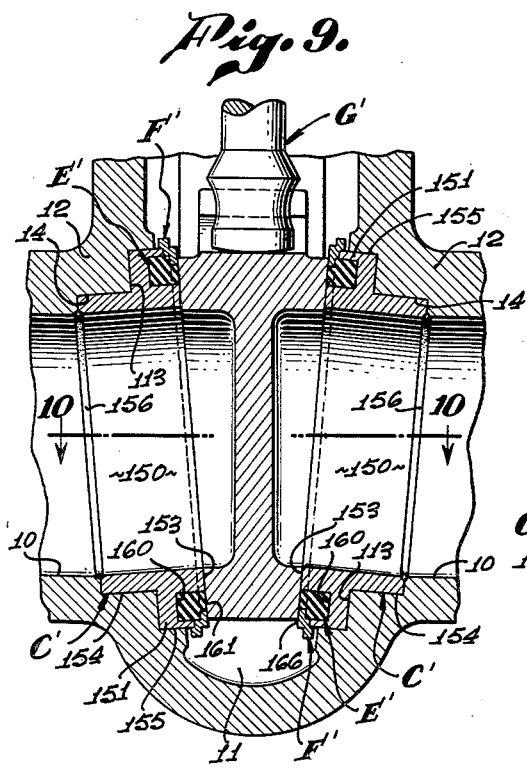
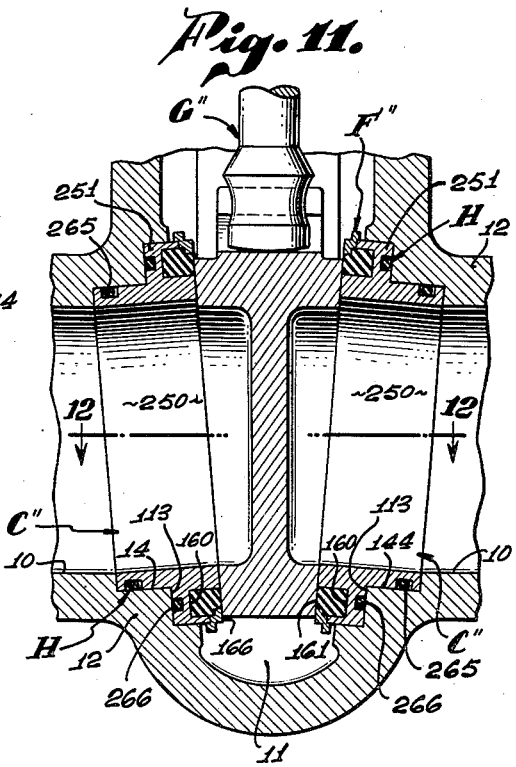
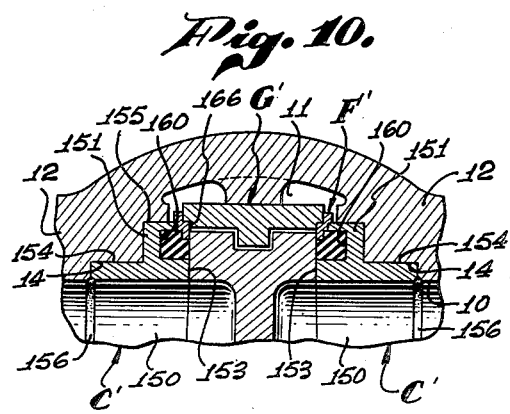
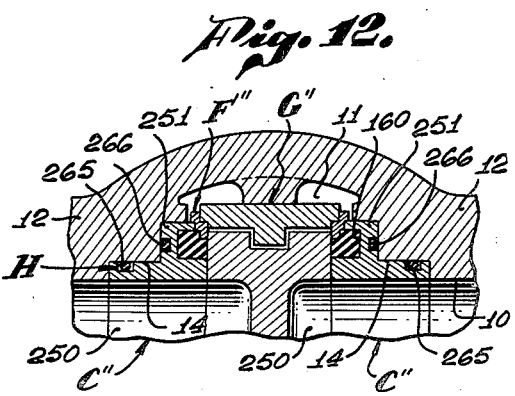
INVENTOR.
LELAND S. HAMER,
BY
AGENT.

United States Patent Office 2,815,187
Patented Dec. 3, 1957

2,815,187

SEALED GATE VALVE

Leland S. Hamer, Long Beach, Calif.

Application August 2, 1954, Serial No. 447,108

5 Claims. (Cl. 251—328)

This invention has to do with a sealed gate valve, it being a general object of the invention to provide a simple, practical, improved gate valve, that is, for a valve of the gate type wherein seals are provided at or in combination with seats whereby the gate when closed is supported by the seats and is in cooperative engagement with the seals.

This application is a continuation in part of my application Serial No. 360,107, entitled "Sealed Gate Valve," filed June 8, 1953, and now abandond. The general construction or type of structure in which the present invention is embodied is set forth and claimed in my copending application Serial No. 344,931, filed March 27, 1953.

The present invention is concerned specifically with a construction provided to support and seal the gate in the body of a valve, and it is a general object of the invention to provide a simple improved construction characterized by removable seats that are cooperatively related to sealing rings that engage and seal with the gate.

Another object of the invention is to provide a valve construction of the general character referred to wherein removable seats are rigidly carried by or supported in the body of the valve to provide metal to metal contact with the gate, while sealing rings adjacent the seats are effective to provide fluid type seals between the gate and the body.

It is another object of this invention to provide a construction of the general character referred to wherein the seats, which are separable from the body, are threaded thereto by means of simple threaded connections which are simple of manufacture and which are effective in holding the seat rings solidly or firmly in the body to form effective supports for the gate.

It is still another object of this invention to provide a valve construction of the general character referred to wherein corrosion resistant seats are rigidly carried by or supported in a valve body of ordinary material thereby making possible the manufacture of an extremely inexpensive corrosion resistant valve construction. With the present invention only a small amount of special material is required in order to form the seat. Further, the individual seats of the structure provided are easily and quickly replaceable.

The various objects and features of my invention will be fully understood from the following detailed description of typical preferred forms and applications of my invention, throughout which description reference is made to the accompanying drawings, in which:

Fig. 1 is an end view of a valve construction embodying the invention with a certain portion broken away to be shown in section. Fig. 2 is an enlarged vertical sectional view of the valve, being a view taken as indicated by line 2—2 on Fig. 1. Fig. 3 is an enlarged view of a portion of the structure shown in Fig. 2. Fig. 4 is an enlarged view of a portion of the structure shown in Fig. 3, showing the construction provided in the body for reception of the gate, with the gate in a closed position. Fig. 5 is a sectional view taken as indicated by line 5—5 on Fig. 3. Fig. 6 is a plan sectional view taken as indicated by line 6—6 on Fig. 5. Fig. 7 is a plan sectional view taken as indicated by line 7—7 on Fig. 5. Fig. 8 is a view similar to Fig. 3, showing a slightly different form of construction. Fig. 9 is a view similar to Figs. 3 and 8, showing a modified form of the invention. Fig. 10 is an enlarged sectional view taken as indicated by line 10—10 on Fig. 9. Fig. 11 is another view similar to Figs. 3 and 8, showing another modified form of the invention. Fig. 12 is an enlarged sectional view taken as indicated by line 12—12 on Fig. 11, and Fig. 13 is an enlarged detailed sectional view of the sealing ring employed in the valve.

Referring to the form of construction illustrated in Figs. 1 to 7, inclusive, the structure includes a body characterized by an elongate tubular main portion A defining a flow passage 10, and a transverse portion B defining a chamber 11 which intersects the passage 10. The portions 12 of the body occurring where the transverse portion B intersects the main portion A, surround the passage 10 and occur in opposite directions from the chamber 11. The body portions 12 are provided with flat opposed finished faces 13 and are provided with recesses 14 that occur at the corner where the passage and chamber intersect. The construction includes annular seats C carried by the body portions 12, and the seats have finished opposed faces 15. A gate D in the form of a tapered disc is adapted to operate in chamber 11, into and out of position, where it engages and is supported by the seats C. Annular sealing rings E are provided in connection with and surrounding the seats C and are adapted to seal with the body and with the gate when the gate is closed. Annular retainers F hold the seats in operating position, and the means G hold the retainers F in operating position.

The body of the valve as shown in the drawings has coupling flanges 20 at the outer or terminal ends of the main tubular portion A, and the flow passage 10 is a straight opening, round in cross section and extends through the body from one end to the other.

The transverse portion B of the body intersects the main portion A about midway between the ends thereof and includes a part 21 at one side of the portion A forming a bottom for the chamber 11 while a part 22 projects a substantial distance from the other or opposite side of portion A and forms a neck. A cap 23 closes the outer end of the neck and is releasably secured thereto as by screw fasteners 24.

The gate D is a simple disc-shaped element with annular projecting peripheral portions 30 with finished flat faces 31 adapted to seat on or against the seats C while being engaged by the sealing rings E. In the particular construction illustrated the disc is tapered, that is, it is formed so that the finished faces 31 at opposite sides of the disc are in planes that converge downwardly or toward the bottom 21 as clearly shown in Figs. 2 and 3 of the drawings.

A suitable construction is provided for effecting operation of the gate D. The particular structure illustrated includes a stem 38 extending into the chamber 11 through a packing gland 39 carried by the cap 23. A coupling 40 connects the stem 38 and the gate D at the thick edge thereof, and the stem extends up from the gate through the neck 22 through the cap 23 and passes from the cap through the gland 39. The stem has a threaded end portion 42 and arms 43 project up from the cap 23 and rotatably carry a nut 44 threaded on the stem portion 42. A suitable handle or hand-wheel 45 is fixed on the nut 44 to facilitate manual operation thereof.

The seats C carried by the portions 12 of the body are like annular members, each having a base portion 50 carried in and occupying one of the recesses 14 in the body where the passage 10 intersects the chamber 11.

Each seat C is further provided with a head portion 51 that projects from the recessed portion 12 of the body and which has a finished top 53 forming a valve seat. The finished top or seat 53 is a continuous annular flat seat and when the seat member C is in place the seat 53 surrounds and is substantially concentric with the passage through the main tubular portion A of the body. The two seats C are carried by the spaced portions 12 so that the finished seats 53 are spaced apart and are opposed as clearly shown throughout the drawings. Where the opposite sides of the gate D are angularly related or pitched relative to each other, the faces 13 of body portions 12 and the recesses 14 are correspondingly inclined or pitched relative to each other so that the seats C when in place are supported in or by the portions 12, are inclined or pitched relative to each other, and converge downwardly so that when the gate is closed as shown in Figs. 2 and 3 of the drawings, the finished faces 31 of the gate fit against and are effectively supported by the faces 53.

In accordance with the form of the invention under consideration the base portions 50 of the seats C are externally threaded and the side or annular walls of recesses 14 are correspondingly threaded. When the seat members are in place they are screw threaded into the body to occupy the recesses 14. In the particular case under consideration the heads or head portions 51 of the seats C project radially outward from or beyond the base portions 50, and when the seats are in operating position the heads 51 are supported on or set against the finished faces 13 of the body portions 12.

When the seats C are in place, that is, when they are screw threaded into the body portions 12, they are substantially concentric with the passage 10 extending through the body. In practice, it is preferred that means such as either recesses or projections 48 be provided on or at the interiors of the seats C to facilitate engagement with the seats to effect threading them into or from the parts of the body that support them.

The sealing rings E are simple annular rings of suitable sealing material, and in the preferred form of the invention they are formed of a material such as synthetic rubber or "Teflon." The sealing rings E are carried on the seats C and in the form of the invention under consideration the sealing rings fit tight around the outer peripheries 56 of the seats, and they seat against the finished faces 13 of the body portions 12. In the particular case under consideration the faces 13 have finished annular recesses 60 into which the sealing rings seat. The sealing rings when seated against the body portions 12 have sealing parts or ends 61 projecting somewhat from or beyond the tops 53 as clearly shown in Fig. 4 of the drawings. As illustrated in Fig. 13 of the drawings, the ends 61 of the sealing rings are provided with inner and outer peripheral steps 62 and 63, respectively, that provide for compression of the sealing rings by allowing the ends 61 to expand as the gate D is engaged therewith.

The retainers F provided to hold the sealing rings E are simple annular members which, when in place, surround and engage the outer peripheries 65 of the sealing rings while seating in or against the bottom of the recesses 60. The tops 53 preferably project slightly beyond the outer ends 66 of the retainers so as to engage the gate and insure tight sealing engagement therewith.

The means G provided to hold the retainers F is of the type fully set forth and claimed in my copending application. As shown in the drawings the means G includes two like elongate keys 70 carried in the neck portion 22 of the body and projecting down therefrom to the retainers diametrically opposite the sides thereof to engage the outer peripheries 71 of the retainers while, at the same time, engaging flanges 72 projecting from the outer peripheries of the retainers. In the preferred construction the lower end portions 75 of the keys that engage the retainers are downwardly tapered or convergent corresponding to the pitching or inclination of the retainers.

Through this construction the keys have effective engagement with the retainers, and when the keys are forced or pressed down or toward the bottom 21 they effectively spread the retainers apart. The keys by engaging the flanges 72 are effective in holding the retainers tight against the faces 13 of the body portions 12, whereas the peripheries 71 of the retainers by engaging the keys effectively hold the keys apart, in fact, so space and hold the keys that the gate D is properly positioned and slidably accommodated between them. In the case illustrated guide ribs 80 are provided on the opposite sides 81 of the keys, and grooves 82 are provided in the diametrically opposite edge portion of gate D to slidably engage the ribs 80. Through this construction the gate is effectively guided by the keys to move freely lengthwise in the chamber 11. The keys 70 when in place are held down by the cap 23, that is, by portions 90 of the cap that overlie the upper ends of the keys, as clearly shown in Fig. 1 of the drawings.

In the form of construction illustrated in Fig. 8 of the drawings, the construction is essentially the same as that hereinabove described. The seat rings C, in this case, differ somewhat from those above described, in that their base portions 50' are somewhat heavier and project radially outward from the head portions 51'. As a result of this relationship of parts the bottoms 98 of the sealing rings E, which may be the same as sealing rings above described, seat not only against the finished faces 13 in the body portions 12 but also overlie and seat against the base portions 50' of the seats. In action and other particulars the parts may be of the same as above described.

In the form of the invention illustrated in Figs. 9 and 10 of the drawings, I have provided seats C' carried by the portions 12 of the body which seats are like annular members each having a base portion 151 carried in and occupying one of the recesses 14 in the body where the passage 10 intersects the chamber 11. Each seat C' is advantageously formed of corrosion resistant material and is further provided with a head portion 151 that projects from the recessed portion 12 of the body and which has a finished top 153 forming a valve seat. The finished top or seat 153 corresponds to the top 53 above described, and is inclined or pitched relative to the axis of the chamber 11 that intersects the passage 10.

In accordance with the form of the invention shown in Figs. 9 and 10, the base portions 150 of the seats C' are cylindrical elements having smooth inner and outer walls. The outer walls of the base portions 150 are slidably carried in the recesses 14 and are secured to the valve body by means of light welding 156. It will be apparent how the welding forms a fluid tight connection when it is applied in a continuous annular ring, as shown. When the seat members are positioned and carried in the recesses 14 and are secured in place by the welding 156, the heads or head portions 151 of the seats C' project radially outward from or beyond the base portions 150 and when the seats are in operating position the heads 151 are supported on or are set against finished faces 113 corresponding to the faces 13 as set forth in connection with the first form of the invention.

The sealing rings E' as shown in Figs. 9 and 10 of the drawings, are essentially the same as the rings E above referred to, are carried on the seats C' and are designed to fit and occupy finished recesses 160 that are formed in the heads 151 of the seats C'. The tops 153 above referred to occur adjacent the inner peripheral portion of the seats C' while outer peripheral seats 154 are provided at the outer peripheral portions of the seats C'. As clearly illustrated in Figs. 9 and 10, the tops 153 adjoin the inner edge of the recesses 160 while the seats 154 adjoin the outer edge of the recesses 160. The sealing rings E' when seated in the recesses 160 have sealing parts or ends 161 projecting somewhat from or beyond the tops and seats 153 and 154, respectively.

The retainers F' provided to hold the sealing rings E' are simple annular members similar to the retainers F, above described, and engage the outer peripheries 155 of the heads 151 and have seating engagement with the seats 154. The retainers F' have tops 166 corresponding to the tops 66 of the retainers above described. The tops 166 and 153 of each seat C' may be in the same plane, however, the top 153 preferably projects slightly beyond the plane of the top 166 of each retainer so as to engage the gate and insure tight sealing engagement therewith.

The means G' provided to hold the retainers F' may be identical to the means G above described, and it will be apparent how the means G will act to retain the parts of this form of the invention in proper work relationship as above described in detail in connection with the first form of the invention.

In the form of the invention illustrated in Figs. 11 and 12 of the drawings, the seats C'' are carried by the portions 12 of the body and are like members each having a base portion 250 carried in or occupying one of the recesses 14 in the body where the passage 10 intersects the chamber 11. Each seat C'' is further provided with a head portion 251 that projects from the recessed portion 12 of the body. The bases and heads 250 and 251 may be the same as the bases and heads 150 and 151 above described, and the recesses 14 in the body are straight cylindrical bores adapted to have sliding engagement with the base portions 250. In accordance with this form of the invention the means F'' and G'' may be identical to the corresponding means of the invention as above described, and in addition to the means thus far referred to this form of the invention includes seals H between the seats C'' and the recesses 14 in the portions 12 of the valve body.

In accordance with the form of the invention illustrated in Figs. 11 and 12, the seals H are provided to seal between the seat C'' and the portions 12 of the body. The seals H may be O-ring type seals carried in annular grooves formed in the seats C''. As shown, I have provided two seals H in connection with each seat, there being a radially disposed O-ring type seal 165 carried in a groove in the periphery of the base portion 150, and an axially disposed O-ring type seal 166 carried in a groove in the head 251. The seal ring 165 has sealing engagement with the bore of the recess 14 while the seal ring 166 has sealing engagement with the face 113 at the portions 12 of the body.

In accordance with the form of the invention illustrated in Figs. 11 and 12, the parts of the structure may be assembled as above described in connection with the other two forms of the invention and it will be apparent that the retainers F'' and the means G'' will hold the sealing rings E'' and the seats C'' in proper operating position.

With the construction provided as hereinabove described, the seats when threaded to or otherwise secured in the body portions 12 occupy the recesses and seat against the faces in the portions 12 so that they are rigid with and are solidly supported by the body. The sealing rings surrounding or carried by the seats seal against the seats and when the gate D is closed, also seal with the gate. The retainers F, F' and F'' are positioned to surround the sealing rings and effectively hold the rings in place. In the preferred construction recesses 93 are provided in the retainers at the bottoms thereof which engage the finished faces 13 of body portions 12, or faces 113 of the seat heads as the case may be, and flanges 95 project radially outward from the sealing rings and fit into the recesses 93. Through this construction the retainers over-lap or over-lie portions of the sealing rings and thus effectively hold the sealing rings against displacement.

With the construction provided by the present invention, all parts of the mechanism subject to wear or deterioration are renewable or subject to replacement or repair. The gate is, of course, subject to being removed to effect replacement or renewal of the working parts, the cap 23 can be removed carrying with it the stem 38 and the gate D on the stem. With the cap 23 removed the keys 70 can be lifted out of place and following this, the retainers engaged with the sealing rings can be readily removed from operating position. After the retainers have been removed the sealing rings can be removed and replaced, and in many cases this may be all that is required to be done. If the seats C, C' and C'' which provide the metal to metal support between the body and the gate, require replacement or repair they can be removed by sliding them from the body portion 12, or by unscrewing them from the body portions 12, or by cutting the welding and then sliding them from the body portion 12, depending of course on which form of the invention is employed. The seats can be easily reached through the flow passage 10, and when separated from portions 12 they can be lifted out of the body through the open neck 22.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A valve comprising a body having a main tubular part defining a longitudinal flow passage and having a transverse portion defining a chamber intersecting the passage, a removable bonnet closing said chamber, the body having opposed angularly related recesses therein at the corners between the passage and chamber, a tapered disc gate in the body, opposed annular angularly related seats in the body and occupying the said recesses and spaced apart to receive the gate snugly between them, the opposing faces of said seats having annular grooves therein opening toward said gate, resilient sealing rings in the grooves of said seats and having annular sealing faces projecting from the seats for sealing engagement with the gate when the gate engages the seats, an annular retaining ring partially overlapping the sealing face of each of the sealing rings to hold each ring in working position in its groove, each such ring engaging an outer annular face of the seat radially outwardly of the seat groove, and an elongated key insert contacting said bonnet and extending through said chamber into said body main tubular part to be snugly interposed between said retainer rings and in contact therewith radially outwardly of said sealing rings and said seats.

2. In a valve having a valve body defining a flow passage, a bonnet chamber intersecting said passage, a pair of spaced angularly related seats adapted to receive a tapered gate therebetween, said gate being movable into and out of said chamber, and a bonnet closing one end of the bonnet chamber, the improvements of annular resilient seals carried by said seats, respectively, to contact the gate when the gate is interposed between said seats, and means for removably retaining said seals in position on said seats, including annular retaining rings contacting the outer peripheral portions of said seats and said seals and respectively partially overlying the faces of said seals adjacent said seats, diametrically opposed retaining keys projecting from said chamber into said valve body to be retained by said bonnet in said valve body in transversely spaced relation straddling said gate to guide said gate for movement toward and away from said bonnet, each of said keys being interposed between the spaced retaining rings and each of said keys having lateral extremities contacting the retaining rings to urge the same into retaining engagement with the seals and the seats.

3. In a valve having a valve body defining a flow passage, a tapered gate movable transversely of said passage, a pair of opposed angularly related annular seats surrounding said passage and adapted to receive the tapered gate therebetween, each seat having an annular groove in the face thereof directed toward said gate, annular resilient seals carried by said seats, respectively, and seated in said grooves, said seals projecting beyond the seats to contact the gate when the gate is interposed between said seats, and means for removably retaining said seals in position in said seat grooves, including annular retaining rings having radial and axial surfaces contacting the adjacent outer peripheral portions of said seats and said seals, a retaining key extending into said valve body on either side of said gate exteriorly of said flow passage to guide movement of said gate, each of said keys being wedged between the spaced retaining rings and contacting the rings to urge the same into retaining engagement with the seals and the seats.

4. In a valve having a valve body defining a flow passage, a tapered gate movable transversely of said passage, a pair of opposed angularly related annular seats surrounding said passage and adapted to receive the tapered gate therebetween, annular resilient seals carried by said seats, respectively, said seals projecting beyond the seats to contact the gate when the gate is interposed between said seats, and means for removably retaining said seals in position in said seat grooves, including annular retaining rings contacting said seats and said seals, a retaining key extending into said valve body on either side of said gate exteriorly of said flow passage, each of said keys being wedged between the spaced retaining rings and contacting the rings to urge the same into retaining engagement with the seals and the seats.

5. A gate valve assembly comprising a valve body having a longitudinal flow passage therethrough and an open-ended chamber in communication with said flow passage and extending transversely from one side thereof, a bonnet secured to said valve body to close said chamber, a tapered gate having oppositely facing sealing surfaces, means extending through said chamber and carried by said bonnet for moving said gate from an open position within said chamber transversely across said passage to a closed position wherein said gate is located to prevent the flow of fluid through said passage, a pair of oppositely facing annular sealing surfaces on said gate, said sealing surfaces lying in respective planes symmetrically inclined with respect to a plane normal to the axis of said flow passage and convergent toward the side of said flow passage opposite said chamber, said valve body being recessed to provide a pair of longitudinally spaced annular seats, an annular sealing ring seated on each of said seats, each sealing ring having a first annular sealing surface abutting the associated seat of said valve body, a second annular sealing surface on the opposite side of each sealing ring from said first sealing surface and sealingly engageable with the sealing surface of said gate when said gate is in said closed position, an annular resilient seal in surface contact with each of said sealing rings to project axially therebeyond radially outwardly of said second annular sealing surface, a retaining ring overlying the radially outward extremity of each of said resilient seals, an insert member removably carried by said valve body and engaging each of said retaining rings to maintain said retaining rings against said seals.

References Cited in the file of this patent

UNITED STATES PATENTS

| 108,522 | Saefly | Oct. 18, 1870 |
| 585,684 | Martin | July 6, 1897 |
| 880,463 | Paul | Feb. 25, 1908 |
| 1,752,657 | Sparks | Apr. 1, 1930 |
| 2,048,884 | Nordstrom | July 28, 1936 |
| 2,194,261 | Allen | Mar. 19, 1940 |
| 2,636,713 | Hamer | Apr. 28, 1953 |

FOREIGN PATENTS

| 4,620 | Great Britain | Mar. 10, 1900 |